(12) United States Patent
Claussen et al.

(10) Patent No.: US 11,550,288 B2
(45) Date of Patent: Jan. 10, 2023

(54) METHOD FOR REPLACING LEGACY PROGRAMMABLE LOGIC CONTROLLERS

(71) Applicant: Siemens Aktiengesellschaft, Munich (DE)

(72) Inventors: Heiko Claussen, North Brunswick, NJ (US); Volkmar Sterzing, Neubiberg (DE); Juan L. Aparicio Ojea, Moraga, CA (US)

(73) Assignee: Siemens Aktiengesellschaft, Munich (DE)

( * ) Notice: Subject to any disclaimer, the term of this patent is extended or adjusted under 35 U.S.C. 154(b) by 245 days.

(21) Appl. No.: 16/768,380

(22) PCT Filed: Jul. 30, 2018

(86) PCT No.: PCT/US2018/044277
§ 371 (c)(1),
(2) Date: May 29, 2020

(87) PCT Pub. No.: WO2019/125519
PCT Pub. Date: Jun. 27, 2019

(65) Prior Publication Data
US 2020/0293013 A1    Sep. 17, 2020

Related U.S. Application Data

(60) Provisional application No. 62/607,037, filed on Dec. 18, 2017.

(51) Int. Cl.
*G05B 19/05* (2006.01)
*G06N 20/00* (2019.01)

(52) U.S. Cl.
CPC .......... *G05B 19/056* (2013.01); *G06N 20/00* (2019.01); *G05B 2219/13004* (2013.01); *G05B 2219/163* (2013.01)

(58) Field of Classification Search
None
See application file for complete search history.

(56) References Cited

U.S. PATENT DOCUMENTS 10,591,886 B2 * 3/2020 Kawanoue ......... G05B 23/0289
2004/0249480 A1  12/2004 Lefebvre et al.
(Continued)

FOREIGN PATENT DOCUMENTS

DE  10 2009 028655 A1   2/2011
WO  2011/082908 A1      7/2011
(Continued)

OTHER PUBLICATIONS

Anonymous: 11SPS-MAGAZI N -MachineLearning in Steuerungstechnik und Robot i k 11, Dec. 12, 2017 (Dec. 12, 2017), XP055508711, Retrieved from the Internet: URL:https://www.sps-magazin.de/?inc=artike l/article show&nr=136818 [retrieved on Sep. 21, 2018] pp. 1,5.
(Continued)

*Primary Examiner* — Ryan D. Coyer

(57) ABSTRACT

Over the past several decades, rapid advances in semiconductors, automation, and control systems have resulted in the adoption of programmable logic controllers (PLCs) in an immense variety of environments. Machine learning techniques help train replacement PLCs when a legacy PLC must be replaced, e.g., due to aging or failure. The techniques facilitate the efficient adoption and correct operation of replacement PLCs in the industrial environment.

16 Claims, 7 Drawing Sheets

(56) References Cited

U.S. PATENT DOCUMENTS

| | | | | |
|---|---|---|---|---|
| 2011/0118857 A1* | 5/2011 | Bodnar | ................. | G06N 20/00 |
| | | | | 700/47 |
| 2012/0304007 A1* | 11/2012 | Hanks | ............... | G05B 23/0229 |
| | | | | 714/E11.029 |
| 2015/0346706 A1* | 12/2015 | Gendelman | .......... | G05B 19/058 |
| | | | | 700/79 |
| 2016/0098021 A1* | 4/2016 | Zornio | .............. | G05B 13/0265 |
| | | | | 700/47 |
| 2017/0343967 A1* | 11/2017 | Verma | ................. | G05B 13/021 |
| 2018/0136910 A1* | 5/2018 | Noetzelmann | ............ | G06F 8/30 |
| 2019/0104633 A1* | 4/2019 | Ross | .................... | H05K 7/1467 |
| 2019/0297095 A1* | 9/2019 | Formby | .............. | G05B 19/058 |
| 2020/0015381 A1* | 1/2020 | Ross | ................... | H05K 7/1479 |

FOREIGN PATENT DOCUMENTS

| | | | | |
|---|---|---|---|---|
| WO | 2015/075615 A1 | | 5/2015 | |
| WO | WO-2015075615 A1 * | | 5/2015 | ........... G05B 19/048 |

OTHER PUBLICATIONS

PCT International Search Report and Written Opinion of International Searching Authority dated Jan. 3, 2019 corresponding to PCT International Application No. PCT/US2018/044277 filed Jul. 30, 2018.

\* cited by examiner

METHOD FOR REPLACING LEGACY PROGRAMMABLE LOGIC CONTROLLERS

PRIORITY CLAIM

This application is the U.S. national stage of International application no. PCT/US2018/044277 filed 30-Jul.-2018 claiming priority to U.S. provisional application Ser. No. 62/607,037 filed 18 Dec. 2017, which is entirely incorporated by reference.

TECHNICAL FIELD

This disclosure relates to replacing programmable logic controllers. More particularly, this disclosure relates to machine learning techniques that allow programmable logic controllers to learn the correct behavior of legacy programmable logic controllers so that those legacy programmable logic controllers may be replaced.

BACKGROUND

Over the past several decades, rapid advances in semiconductors, automation, and control systems have resulted in the adoption of programmable logic controllers (PLCs) in an immense variety of process automation environments. Individual and interconnected PLCs are deployed in a very wide range of industrial control systems and carry out an immense variety tasks, but they also need to be replaced as they age. Improvements in replacing legacy PLCs will enhance the ability of automation environments to continue running correctly and with reduced downtime.

DETAILED DESCRIPTION

Over the past several decades, rapid advances in semiconductors, automation, and control systems have resulted in the adoption of programmable logic controllers (PLCs) in an immense variety of process automation environments. In many cases, PLCs are designed for high reliability in challenging industrial environments and have very long lifetimes. These advantages, however, create technical problems when working with legacy PLCs. As examples, the technical problems include the lack of spare parts, unavailability of proprietary programming terminals, missing programming documentation, and the gradual loss of the engineering skills needed to program, install, troubleshoot and verify the operation of the legacy PLCs.

The systems and techniques described below solve the technical problems involved with replacing legacy PLCs in industrial environments without incurring the significant costs of both the hardware and software engineering required to build a new controller from scratch, not to mention the losses associated with production downtime. The systems and techniques also address additional technical problems with PLCs. For instance, selecting a particular PLC often results in the purchaser being locked-in to a specific automation vendor for many years. In part, this is due to proprietary end-to-end protocols and monolithic architectures. Accordingly, it is a technical challenge to adapt a production environment to newly emerging best-of-class PLC hardware.

The systems and techniques incorporate machine learning, such as deep neural networks and deep reinforcement learning, to train a replacement PLC for a legacy PLC. The machine learning facilitates having the replacement PLC learn the behavior of the legacy PLC (or a simulated control environment). The replacement PLC may thereby imitate the legacy PLC without requiring resource intensive dedicated programming. A PLC with machine learning software, hardware, or both is referred to below as an ML-PLC. An ML-PLC may be an individual physical entity, e.g., a PLC with ML hardware and software, or may be a virtualized entity that exists, e.g., as a software simulation.

The systems and techniques use machine learning to understand what a given legacy PLC is doing in a given automation environment. The systems and techniques also use machine learning to understand why the legacy PLC is doing what it is doing. In this regard, the systems and techniques may ascertain they "why" with respect to a quality measure, and actually improve the operation of the automation environment by achieving better outcomes using the ML-PLC, e.g., by modifying actions that the legacy PLC would have taken to produce improved actions. A further technical advantage is that the systems and techniques document and identify the operation of the legacy PLCs, which is a significant challenge due to the lack of documentation and experience as noted above.

Figure 1:
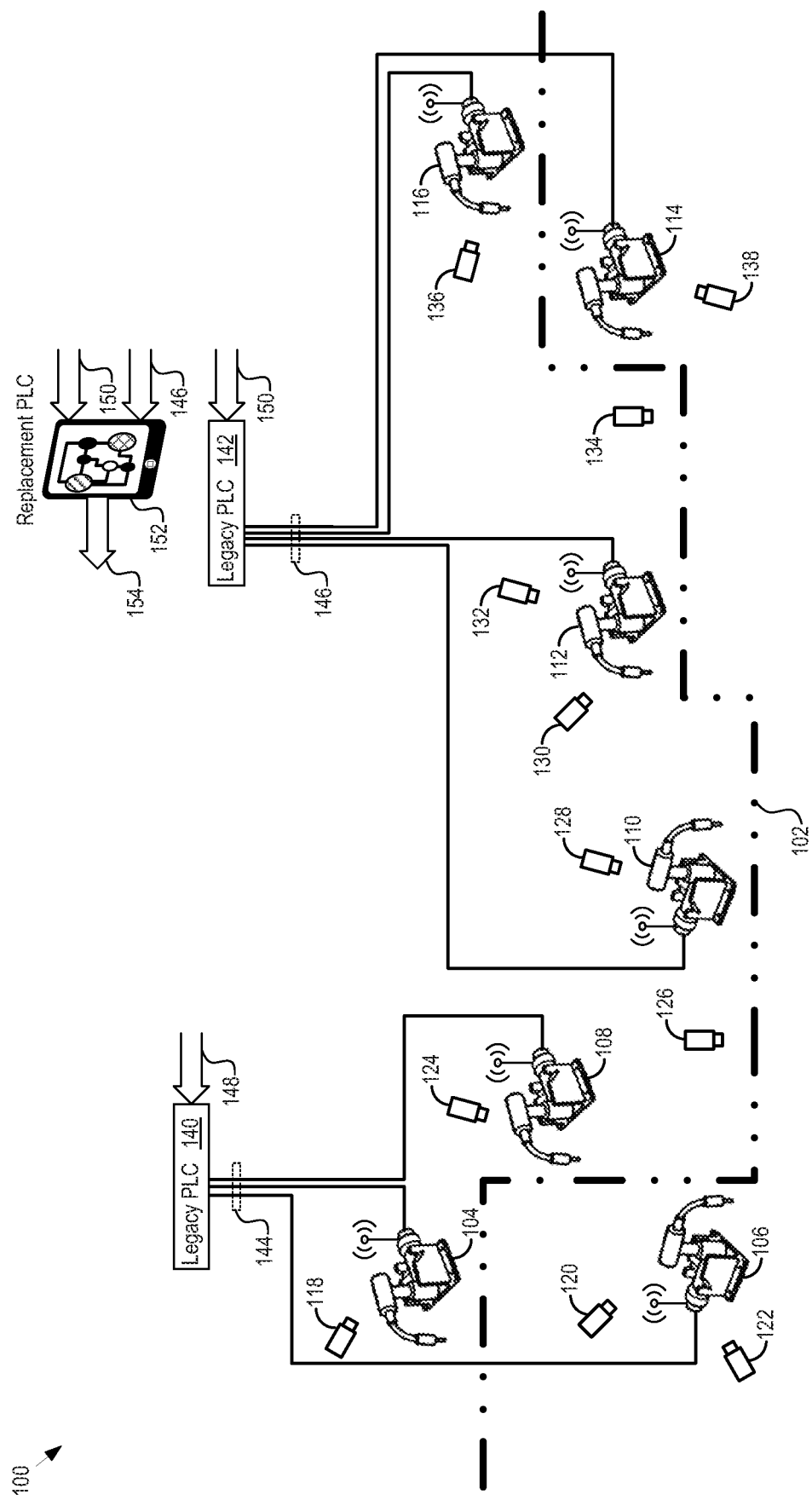
FIG. 1 shows an example industrial automation environment.

FIG. 1 shows an example industrial automation environment 100. The automation environment 100 includes an assembly line 102 and multiple manufacturing devices positioned along the assembly line, e.g., the devices 104, 106, 108, 110, 112, 114, and 116. The automation environment 100 also includes sensors, e.g., the sensors 118, 120, 122, 124, 126, 128, 130, 132, 134, 136, and 138 that provide feedback from the environment 100. The manufacturing devices 104-116 may be any type of controlled machine or system, including as just a few examples: robots, mixers, welders, belts, conveyors, lifts, injectors, lathes, milling machines, fixtures, planers, and the like. the sensors 118-138 may be any type of feedback device, including as just a few examples: cameras, microphones, current sensors, voltage sensors, rotation sensors, vibration sensors, rpm sensors, pressure sensors, touch sensors, proximity sensors, thermocouples, volume sensors, tilt sensors, temperature sensors, and the like.

In FIG. 1, the legacy PLC 140 and the legacy PLC 142 control the devices 104-116 through their PLC outputs 144 and PLC outputs 146, respectively. The legacy PLC 140 and legacy PLC 142 generate their PLC outputs 144 and PLC outputs 146 responsive to the PLC inputs 148 and PLC inputs 150, respectively. The PLC inputs 148 and PLC inputs 150 may include signals from the sensors 118-138, the devices 104-116, other PLCs and other systems, operator inputs, or any other input sources.

Figure 2:
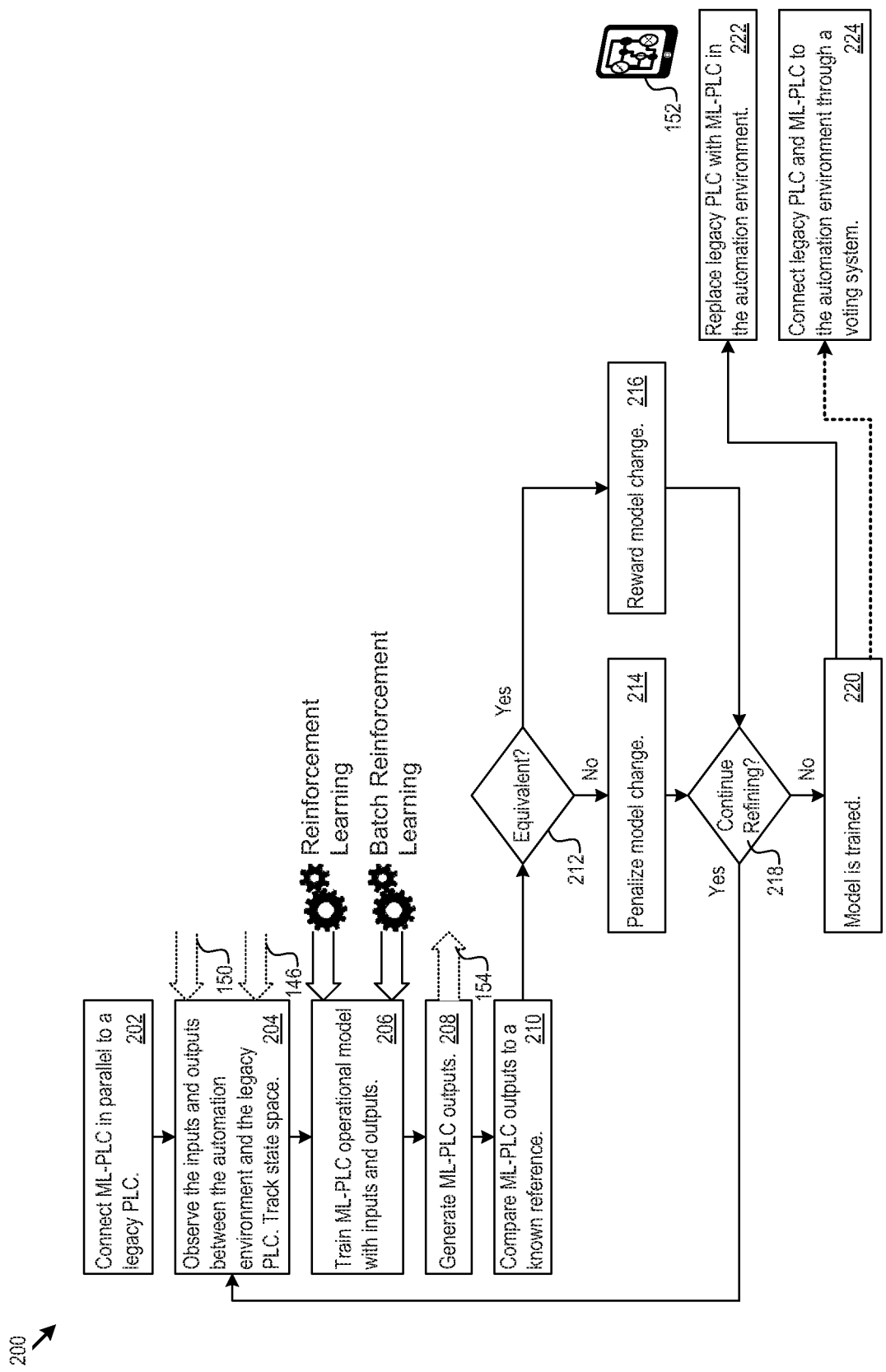
FIG. 2 illustrates example logic for replacing a legacy PLC.

One implementation of the ML-PLCs is described further below with respect to FIG. 1 and the logic 200 shown in FIG. 2. In FIG. 1, the ML-PLC 152 is connected in a first phase in parallel to the legacy PLC 142 (202). The legacy PLC 142 may be a PLC of any make or model that should be upgraded. More generally, the ML-PLC 152 may connect to any system that should be monitored and potentially upgraded or replaced. Also, note that while FIG. 2 shows a reinforcement learning technique, other types of machine learning processes may be implemented instead or in addition, including, e.g., inverse reinforcement learning. Furthermore, any type of learning may be online or offline learning. With offline or batch learning, a training dataset is typically collected first and then used as a whole for the training, and the training may be model based or model free. With online learning, the training occurs as the training data arrives, e.g., at each step of a simulation, without first collecting an entire training dataset. There are many possible learning techniques that may be implemented. A few examples include: Bayesian reinforcement learning, neural fitted Q-Iteration (NFQ), and deep reinforcement learning.

In the first phase, the ML-PLC 152 observes the inputs and outputs between the automation environment 100 and the legacy PLC 142 (204). More specifically, the ML-PLC 152 observes the PLC inputs 150 and the PLC outputs 146 of the legacy PLC 142. The ML-PLC 152 trains an operational model with these inputs and outputs, e.g., a model developed as part of a deep reinforcement learning or batch reinforcement learning process. The ML-PLC 152 generates ML-PLC outputs 154 responsive to the PLC inputs 150 (208), and compares the ML-PLC outputs 154 to a known reference (210). The known reference may represent the ground truth, e.g., the (assumed correct) PLC output 146 from the legacy PLC 142.

If the outputs from the ML-PLC 152 are not the same or are not equivalent (212), e.g., in the sense that they cause the automation environment 100 to function properly given the inputs, then the ML-PLC 152 penalizes the current operational model change (214). On the other hand, if the outputs are the same or are equivalent, the current operational model change is rewarded (216). With this approach, the ML-PLC 152 refines its operational model over time (218) until the operational model successfully represents the behavior of the legacy PLC 142 (220). Expressed another way, the ML-PLC 152 converges its operational model to the correct operation of the legacy PLC 142. In this respect, the reinforcement learning in the ML-PLC 152 defines a reward function that provides feedback about the performance of the ML-PLC 152 compared to the legacy PLC 142. The ML-PLC 152 uses the reward function to find an optimal policy that maximizes expected future reward.

In the second phase, after convergence, the ML-PLC 152 may be incorporated into the automation environment 100 (222). That is, the ML-PLC 152, after training, may take over the control operations of the legacy PLC 142. After replacement by the ML-PLC, the legacy PLC 142 may be removed from the automation environment 100.

As an alternative, the ML-PLC 152, after training, may be connected to the automation environment 100 through a voting system (224). The voting system takes inputs from the legacy PLC 142 and the trained ML-PLC 152. The voting system determines whether the outputs from the ML-PLC 152 are the same or equivalent to the outputs from the legacy PLC 142. If they are the same or are equivalent, then the voting system allows the ML-PLC 152 to control the automation environment 100 by passing the ML-PLC 152 outputs to the automation environment 100.

As another alternative, the operational model is translated to a specific language. As one example, the language may be the International Electrotechnical Commission (IEC) 61131-3 for programmable logic controllers. The conversion may facilitate process certification by departments of labor or other agencies.

When training the ML-PLC in this way it is possible that not all states of the legacy PLC are observed during the operation. For example, particularly rarely occurring states or particular error scenarios may never be observed during training. To cover these aspects, the operator can modify the operational model or associated programming control code to address any specific pre-determined scenarios. For instance, the operator may define an allowed output parameter space and a safe state transition. If the automatic system receives faulty inputs that would result in undesired output results (e.g., outside the allowed output parameter space), the added scenario may cause the system to transition to a safe state. As another example, the operator may teach the operational model or change to control code, to cover rarely observed conditions, e.g., the activation of an additional cooling mechanism when the outside air temperature reaches above 40 degrees C.

Figure 3:
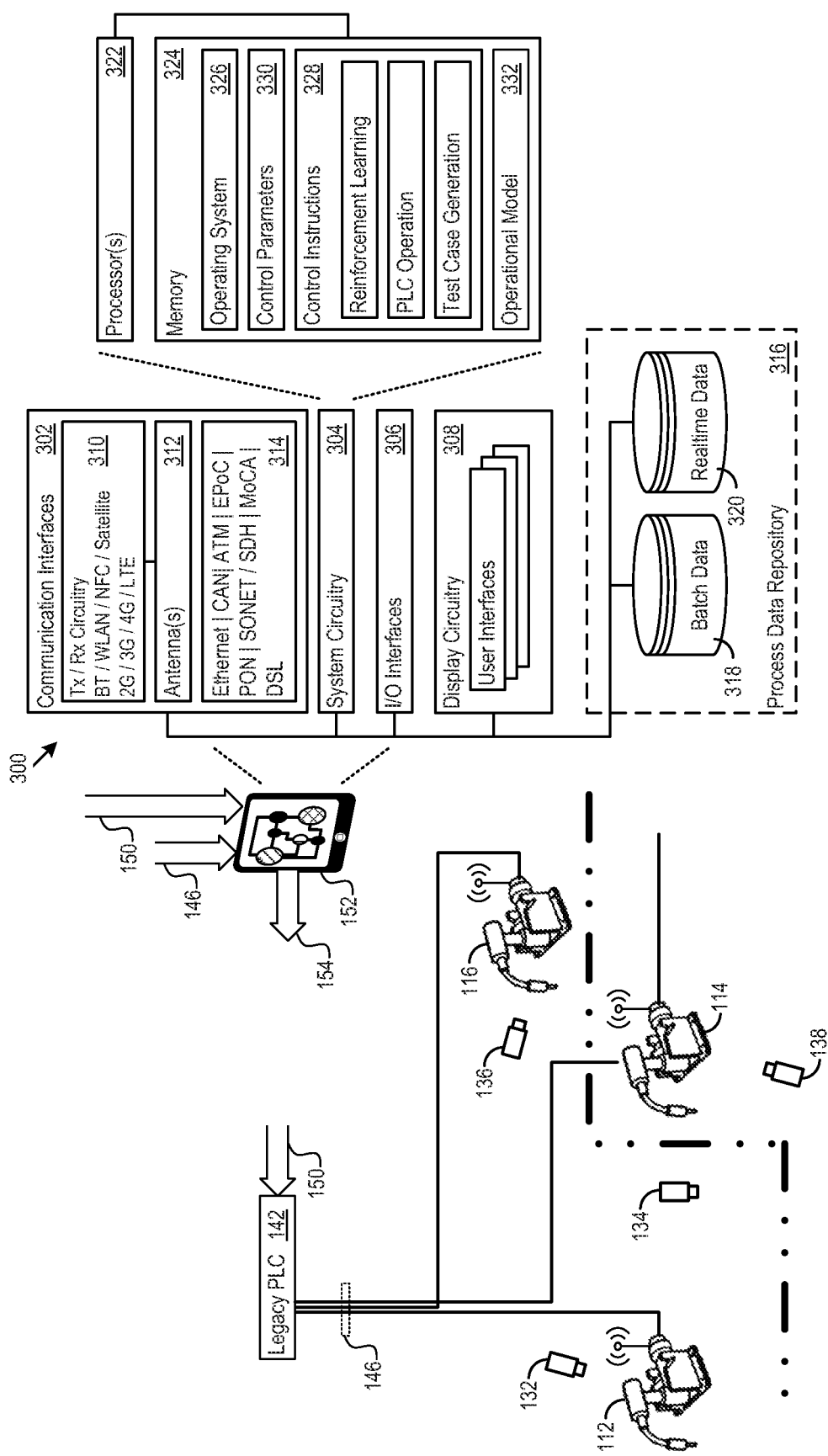
FIG. 3 shows just one example of an ML-PLC implementation.

FIG. 3 shows just one example of an ML-PLC implementation 300. The implementation 300 includes communication interfaces 302, system circuitry 304, input/output (I/O) interfaces 306, and display circuitry 308. The system circuitry 304 may include any combination of hardware, software, firmware, or other circuitry. The system circuitry 304 may be implemented, for example, with one or more systems on a chip (SoC), application specific integrated circuits (ASIC), microprocessors, microcontrollers, discrete analog and digital circuits, and other circuitry.

The system circuitry 304 is part of the implementation of any desired functionality in the ML-PLC 152. Thus, the system circuitry 304 may implement the ML-PLC training, legacy PLC copying, and legacy PLC replacement described above with respect to FIGS. 1 and 2.

The display circuitry 308 and the I/O interfaces 306 may include a graphical user interface, touch sensitive display, voice or facial recognition inputs, buttons, switches, speakers and other user interface elements. Additional examples of the I/O interfaces 306 include Industrial Ethernet, Controller Area Network (CAN) bus interfaces, Universal Serial Bus (USB), Serial Advanced Technology Attachment (SATA), and Peripheral Component Interconnect express (PCIe) interfaces and connectors, memory card slots, and other types of inputs. The I/O interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 302 may include transceivers for wired or wireless communication. The transceivers may include modulation/demodulation circuitry, digital to analog converters (DACs), shaping tables, analog to digital converters (ADCs), filters, waveform shapers, filters, preamplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 310 handles transmission and reception of signals through one or more antennas 132, e.g., to support Bluetooth (BT), Wireless LAN (WLAN), Near Field Communications (NFC), and 2G, 3G, and 4G/Long Term Evolution (LTE) communications.

Similarly, the non-wireless transceivers 314 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

The ML-PLC 152 may store and retrieve data from a local or remote process data repository 316. The data may train the ML-PLC. For instance, the process data repository 316 may store batch data 318 for training the ML-PLC 152 with sets of sampled or captured PLC inputs 150 and PLC outputs 146. In other implementations, the process data repository 316 may store real-time process data (including the sampled or captured PLC inputs 150 and PLC outputs 146) as it streams in from the automation environment 100.

Note that the system circuitry 304 may include one or more controllers 322, e.g., microprocessors, microcontrollers, FGPAs, GPUs, Intel Movidius™ or ARM Trillium™ controllers, and memories 324. The controllers 322 may be dedicated general purpose or customized Al hardware accelerators, for instance. The memory 324 stores, for example, an operating system 326 and control instructions 328 that the controller 322 executes to carry out desired functionality for the ML-PLC 152. Accordingly, the control instructions 328 may execute reinforcement learning to define and train an operational model 332 to copy the behavior of the legacy PLC 142 and to learn why the legacy PLC 142 performs its actions. The control parameters 330 provide and specify configuration and operating options for the control instructions 328.

Figure 4:
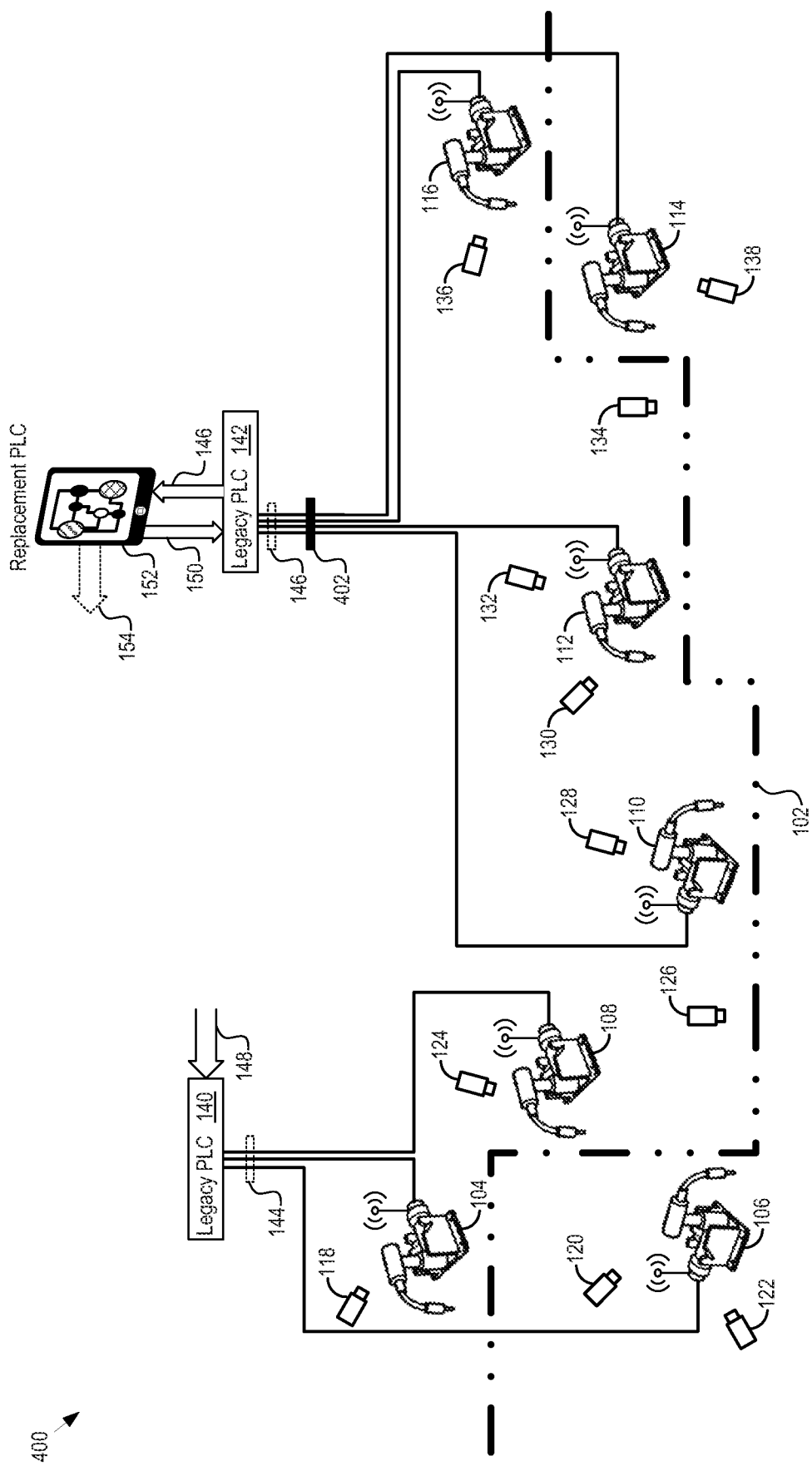
FIG. 4 shows another example industrial automation environment.
Figure 5:
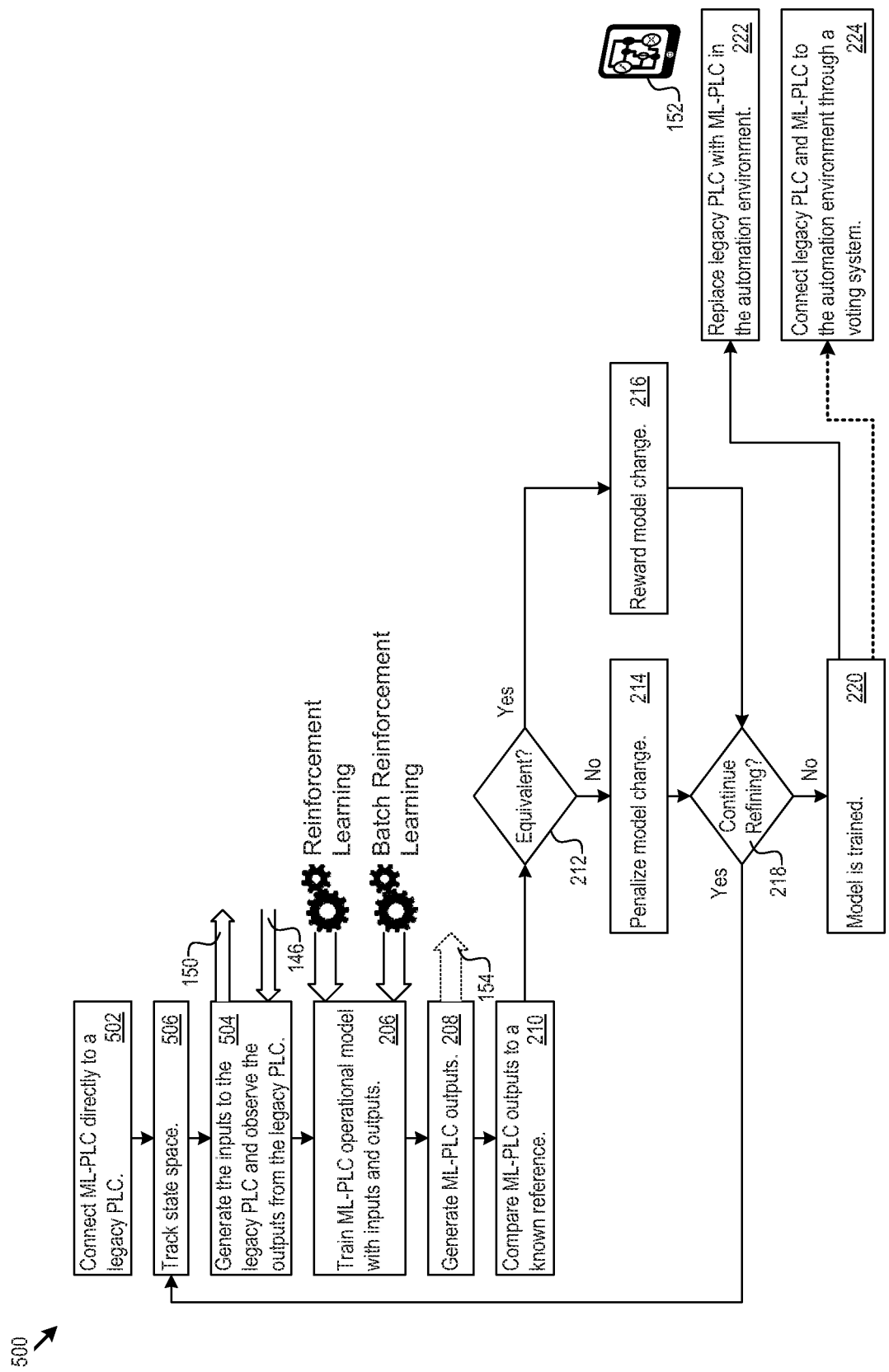
FIG. 5 illustrates another example of logic for replacing a legacy PLC.

FIG. 4 shows another example of replacing a legacy PLC, and FIG. 5 shows corresponding logic 500. In particular, FIG. 4 shows an example of the automation environment 100 in which the ML-PLC 152 communicates directly with the legacy PLC 142 to perform training (502). Under control of the control instructions 328 (for instance), the ML-PLC 152 generates the PLC inputs 150 to the legacy PLC 142 and observes the PLC outputs 146 from the legacy PLC 142 (504). In some cases, the legacy PLC 142 is removed or disconnected from the automation environment 100 to perform the ML-PLC training, e.g., by the disconnection switch 402.

Accordingly, the ML-PLC may map the input/output dependencies of the legacy PLC 142, and may more readily determine a cost function to optimize. As with the example shown in FIGS. 1 and 2, the ML-PLC may monitor which states in the parameter space it has tested and which ones remain untested (506). However, in this scenario, the ML-PLC may choose inputs to the legacy PLC 142 that correspond to states or sequences of states to cover any desired test space, e.g., to cover gaps in the state space not yet encountered by the ML-PLC 152. Further, the ML-PLC 152 may artificially create untested scenarios to learn how the legacy PLC 142 responds to those scenarios. In some implementations, the ML-PLC 152 reports the state space coverage as it copies the operation of the legacy PLC 142, e.g., by generating a coverage user interface via the display circuitry 308.

Note that for any training technique, the ML-PLC 152 may follow pre-defined operating policies, e.g., defined in the control parameters 330. The operating policies may direct the learning behavior of the ML-PLC 152 in many different ways. As examples, the operating policies may direct the ML-PLC 152 to spend more time training specified test cases for correctness, or to spend more iterations to find the correct operation, e.g., when sensitive analog inputs are being received. As another example, the operating policies may define a safety function that is explicitly defined to avoid the need for the ML-PLC 152 to learn the corresponding rules from the legacy PLC 142.

As shown in the Figures, the learning approach taken by the ML-PLC 152 may be, as examples, reinforcement learning or imitation learning. Imitation learning techniques aim to mimic behavior in a given task. That is, the goal of the ML-PLC 152 is to copy the behavior of the legacy PLC 142. If no reward is define or available, techniques such as behavioral cloning, which learns a policy as a supervised learning problem over state-action pairs from expert trajectories (e.g., the legacy PLC 142 outputs) may be applied. Alternatively, inverse reinforcement learning may be applied to the ML-PLC 152. In inverse reinforcement learning, the ML-PLC 152 determines the legacy PLC 142 objectives, values, or rewards by observing the behavior of the legacy PLC 142 and tries to determine the reward function that leads to the behavior of the legacy PLC 142.

Figure 6:
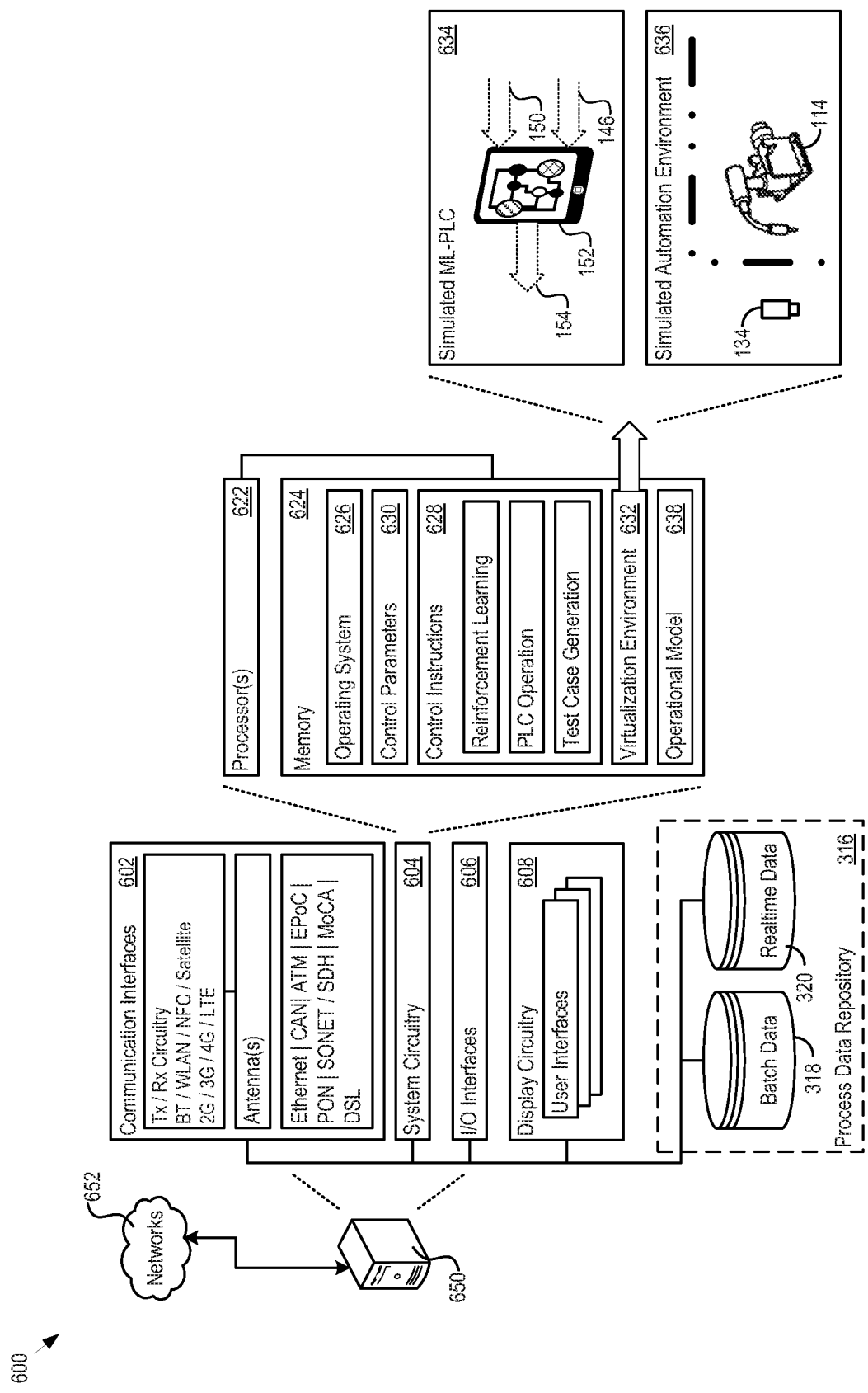
FIG. 6 shows an example of a virtualization instance.
Figure 7:
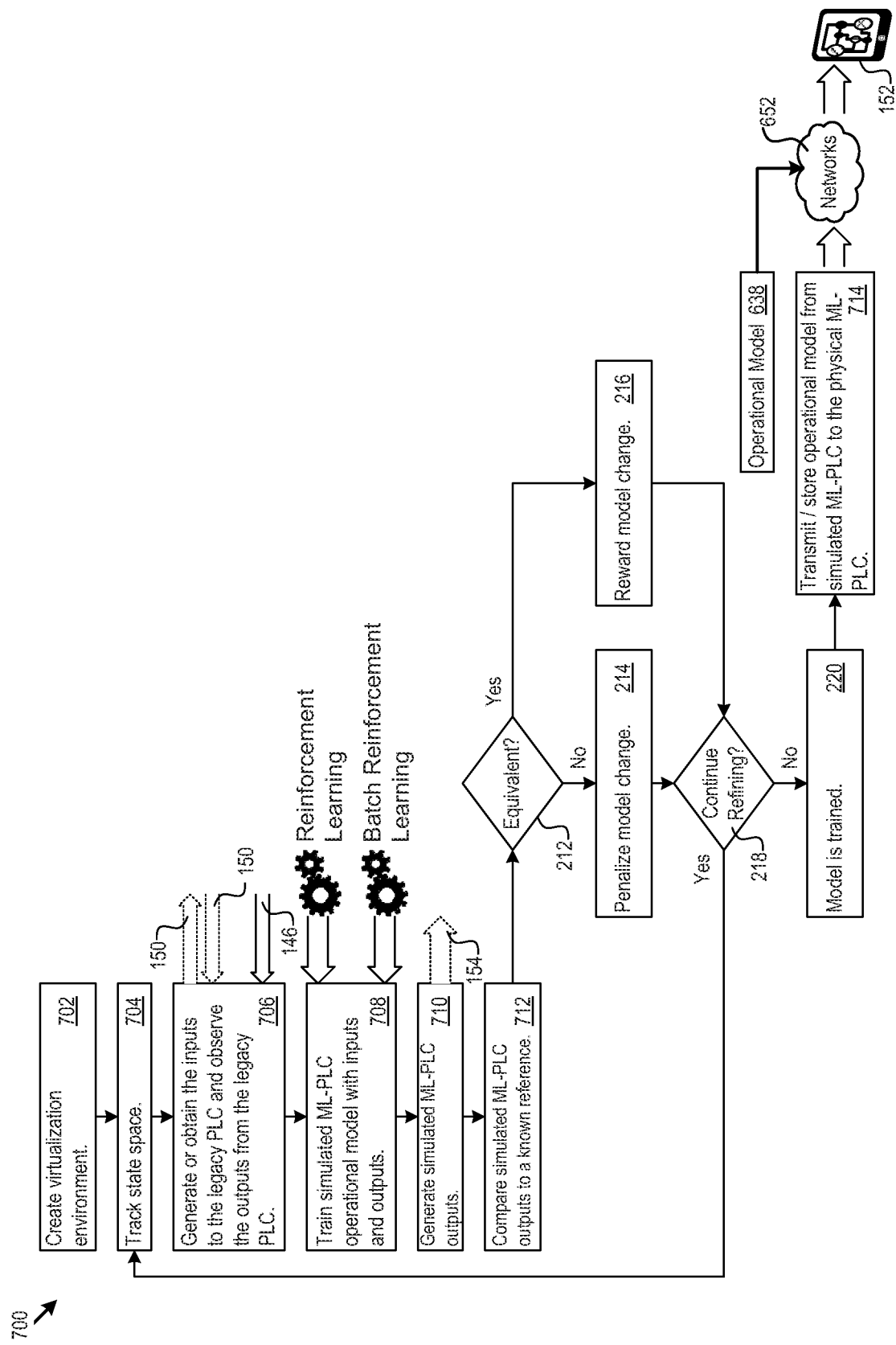
FIG. 7 illustrates another example of logic for replacing a legacy PLC.

FIG. 6 shows an example of a virtualization instance 600. FIG. 7 illustrates another example of logic 700 for replacing a legacy PLC using the virtualization instance 600. The virtualization instance 600 includes a host system 650 connected over any number and type of networks 652, e.g., to the automation environment 100.

The host system 650 includes communication interfaces 602, system circuitry 604, input/output (I/O) interfaces 606, and display circuitry 608. The system circuitry 604 may include any combination of hardware, software, firmware, or other circuitry. The system circuitry 604 may be implemented, for example, with one or more systems on a chip (SoC), application specific integrated circuits (ASIC), microprocessors, microcontrollers, discrete analog and digital circuits, and other circuitry 622 and memories 624.

The system circuitry 604 includes an operating system 626, control parameters 628, and control instructions 630. The system circuitry 604 may thereby create, execute, and maintain a virtualization environment 632 (702). In that regard, the virtualization environment 632 may define a simulated ML-PLC 634 and define, train, and converge an operational model 638 for the simulated ML-PLC 634. The simulated ML-PLC 634 may be, for instance, a "digital twin" of the physical ML-PLC 152. One benefit of this scenario is that the host system 650 may train the simulated ML-PLC 634 without physically allocating PLC hardware to the automation environment 100.

The host system 650 may obtain the training data from the process data repository 316, for instance. In some cases, the process data repository 316 may include batch data 318 for training the ML-PLC 152 with sets of sampled or captured PLC inputs 150 and PLC outputs 146. In other implementations, the process data repository 316 may store real-time process data (including the sampled or captured PLC inputs 150 and PLC outputs 146) as it streams in from the automation environment 100. In connection with the techniques discussed in FIGS. 4 and 5, the host system 650 may track the covered state space and may itself generate test cases. That is, the training may proceed in any manner noted above in FIGS. 1-5, including tracking the state space (704) and generating or obtaining inputs to the legacy PLC and observing outputs from the legacy PLC (706).

In addition, the visualization environment 632 may also define a simulated automation environment 636. The simulated automation environment 636 executes a simulated or virtual instance of the automation environment 100. As such, the simulated automation environment 636 may provide all or some of the PLC inputs 150 and PLC outputs 146 and other data for training the simulated ML-PLC 634.

The host system 650 may use reinforcement learning techniques, as noted above to train the simulated ML-PLC 634 (708), generate simulated ML-PLC outputs (710) and compare the simulated ML-PLC outputs to a known reference (712). One technical benefit of the approach shown in FIGS. 6 and 7 is that no traditional programming needs to be performed of a physical ML-PLC. Another advantage is that the host system 650 can speed up the training of the simulated ML-PLC 634; this may allow the host system 650 to converge the operational model much more quickly than possible in a live production environment.

After convergence, the host system 650 may also validate the operational model by testing the operational model against any desired set of test cases. After testing, the operational model 638 may be transmitted and stored in the physical ML-PLC (e.g., the ML-PLC 152) that will copy the functionality of and replace the legacy PLC 142 (714). Note that the ML-PLC 152 may still be configured with control instructions 328 that continue to refine the operational model based on available process data after it is installed.

Note that in connection with any of the techniques described above, an adversarial network may help test the ML-PLC 152. In more detail, an adversarial network may create test scenarios (e.g., in a controlled environment) that exercise any specified action states. For instance, the adversarial network may analyze the state space that has been tracked while training the ML-PLC and may generate test cases that the ML-PLC has not yet experienced.

Another way of describing the techniques above is that they teach the ML-PLC 152 to replicate and optimize the legacy PLC 142. In that regard, the techniques may implement an autonomous learning process that passively watches the automation environment 100 and uses the process data to: a) identify the relevant state space; b) learn a process/system simulation and key performance indicator (KPI)-prediction model, using, e.g., convolutional neural networks to incorporate temporal dependencies and recurrent neural networks to capture the relevant system dynamics; c) learn the uncertainty of process and system data, depending on the state by using, e.g., Bayesian neural networks; and identify dependencies between process/system data. Note that the process or system KPIs may be identified or manually selected/entered.

The techniques may employ reinforcement learning methods and convolutional neural networks to learn the control policy of the legacy PLC 142. In one implementation, the optimal goal and reward measure is a minimal deviation between the original controller operation and the operational model trained by the reinforcement learning. To measure the deviation, after initializing with the longest identified time dependency associated with the autonomous learning process described above, a closed loop interaction between the known control policy and the operational model is performed, to extrapolate how the ML-PLC 154 would perform for an appropriate period. To furthermore optimize the training, the process system KPIs may be added to the reward measure of the reinforcement learning, leading to improved operation of the ML-PLC 152 (although this may depart from the original operation of the legacy PLC 142). Note that Bayesian neural networks may estimate the uncertainty of the process/system and the controller. As far as acceptable with respect to replication accuracy and/or process KPIs (which may be checked beforehand via the simulation model), the techniques described above may purposefully modify actions taken by the ML-PLC 152 to gain further insight and more information in state space regions with high uncertainty or low coverage.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:
1. A method for replacing a legacy programmable logic controller (PLC), comprising:
    connecting a replacement PLC in an automation environment that includes a legacy PLC;

obtaining, with the replacement PLC, PLC inputs to the legacy PLC and PLC outputs from the legacy PLC;
training an operational model in the replacement PLC with the PLC inputs and the PLC outputs to cause the replacement PLC to copy legacy PLC behavior, wherein training comprises
  training the operational model for the replacement PLC using reinforcement learning including a reward function,
  comparing outputs of the replacement PLC to a known reference, wherein
    an operational model change is rewarded in response to the outputs of the replacement PLC being equivalent to the known reference, and
    the operational model change is penalized in response to the outputs of the replacement PLC being not equivalent to the known reference; and
after training, controlling at least a portion of the automation environment with the replacement PLC instead of the legacy PLC, wherein the controlling comprises:
  connecting a replacement PLC output from the replacement PLC to a voting system;
  connecting a legacy PLC output from the legacy PLC to the voting system; and
  passing either the replacement PLC output or the legacy PLC output to the automation environment under control of the voting system.

2. The method of claim 1, further comprising:
tracking state space coverage of the legacy PLC during training; and
generating training cases for the replacement PLC based on gaps in the state space coverage.

3. The method of claim 1, where:
training comprises: training the operational model for the replacement PLC using machine learning.

4. The method of claim 1, where:
training comprises: training the operational model for the replacement PLC by applying: batch reinforcement learning, online reinforcement learning, or both by: deep reinforcement learning, Bayesian reinforcement learning, or both.

5. The method of claim 1, where controlling comprises:
removing the legacy PLC from the automation environment; and
adding the replacement PLC into the automation environment in place of the legacy PLC.

6. The method of claim 1, where:
obtaining comprises passively listening for the PLC inputs and the PLC outputs as they occur in the automation environment.

7. The method of claim 1, where:
obtaining comprises generating the PLC inputs for the legacy PLC with the replacement PLC.

8. A replacement programmable logic controller (PLC), comprising:
a communication interface operable to connect the replacement PLC in an automation environment that includes a legacy PLC;
a system memory defining an operational model for the replacement PLC; and
system circuitry in communication with the system memory and the communication interface, the system circuitry configured to:
  obtain, with the replacement PLC, PLC inputs to the legacy PLC and PLC outputs from the legacy PLC; and
  train the operational model in the system memory with the PLC inputs and the PLC outputs to cause the replacement PLC to copy legacy PLC behavior, wherein training comprises
    training the operational model for the replacement PLC using reinforcement learning including a reward function,
    comparing outputs of the replacement PLC to a known reference, wherein
      an operational model change is rewarded in response to the outputs of the replacement PLC being equivalent to the known reference, and
      the operational model change is penalized in response to the outputs of the replacement PLC being not equivalent to the known reference; and
an Input/Output (I/O) interface operable to control at least a portion of the automation environment with the replacement PLC instead of the legacy PLC, after the operational model is trained, wherein the I/O interface is configured to:
connect a replacement PLC output from the replacement PLC to a voting system.

9. The replacement PLC of claim 8, where:
the system circuitry is further configured to:
  track state space coverage of the legacy PLC during training; and
  generate training cases for the replacement PLC based on gaps in the state space coverage.

10. The replacement PLC of claim 8, where:
the system circuitry is further configured to:
  train the operational model for the replacement PLC using machine learning.

11. The replacement PLC of claim 8, where:
the system circuitry defines control operation key performance indicators (KPIs) that characterize performance of the replacement PLC, where the control operation KPIs are explicitly pre-defined, obtained from observation of the legacy PLC, or both; and
the system circuitry is further configured to:
  train the operational model for the replacement PLC using online reinforcement learning to optimize control strategy for the replacement PLC with respect to the control operation KPIs.

12. The replacement PLC of claim 8, where:
the system circuitry is further configured to:
  train the operational model for the replacement PLC by applying batch reinforcement learning using:
    neural fitted Q-iteration, deep reinforcement learning, Bayesian reinforcement learning, or any combination thereof.

13. The replacement PLC of claim 8, where:
the system circuitry is configured to obtain the PLC inputs and the PLC outputs by:
  passively listening for the PLC inputs and the PLC outputs as they occur in the automation environment.

14. The replacement PLC of claim 8, where:
the system circuitry is further configured to obtain the PLC inputs by:
  generating the PLC inputs for the legacy PLC with the replacement PLC.

15. A system for training a replacement programmable logic controller (PLC), comprising:
a process data repository comprising:
  operational model training data for an automation environment that includes a legacy PLC; and
system circuitry defining:

a virtualization environment defining a simulated replacement PLC;
an operational model for the simulated replacement PLC; and
reinforcement training control instructions configured to reinforcement train the operational model for the simulated replacement PLC with the operational model training data to cause the simulated replacement PLC to copy legacy PLC behavior, wherein training comprises
   training the operational model for the replacement PLC using reinforcement learning including a reward function,
   comparing outputs of the replacement PLC to a known reference, wherein
   an operational model change is rewarded in response to the outputs of the replacement PLC being equivalent to the known reference, and
   the operational model change is penalized in response to the outputs of the replacement PLC being not equivalent to the known reference,
wherein the virtualization environment further comprises:
   a simulated automation environment configured to generate the operation model training data in the process data repository.

16. The system of claim 15, where:
the system circuitry is configured to:
   transmit the operational model, after reinforcement training, to a physical replacement PLC for the legacy PLC in the automation environment.

* * * * *